United States Patent [19]

Marx et al.

[11] Patent Number: 4,768,535
[45] Date of Patent: Sep. 6, 1988

[54] DEVICE FOR THE COOLING OF LARGE, RUBBER-COATED TANKS WITH LIQUID NITROGEN

[75] Inventors: Bodo Marx, Willich; Jurgen Busse, Monchengladbach, both of Fed. Rep. of Germany

[73] Assignee: Messer Griesheim GmbH, Fed. Rep. of Germany

[21] Appl. No.: 49,508

[22] Filed: May 14, 1987

[30] Foreign Application Priority Data

Jun. 12, 1986 [DE] Fed. Rep. of Germany ....... 3619788

[51] Int. Cl.$^4$ .............................................. B08B 9/08
[52] U.S. Cl. ................... 134/169 R; 62/155;
62/303; 62/514 R; 134/171; 134/188; 134/192
[58] Field of Search ............... 134/22.1, 22.11, 166 R, 134/169 R, 171, 182, 188, 192, 199, 200; 366/270; 62/155, 514 R, 303

[56] References Cited

U.S. PATENT DOCUMENTS 1,720,549  7/1929  Gilchrist .......................... 366/270 X
2,662,042  12/1953  Dougherty et al. ............... 134/22.1
3,623,910  11/1971  Calhoun et al. .................. 134/188 X Primary Examiner—Philip R. Coe
Attorney, Agent, or Firm—Connolly & Hutz

[57] ABSTRACT

A device for cooling rubber-coated large containers with liquid nitrogen to crack and remove the rubber coating includes at least one annular duct with sprayers for directing the liquid nitrogen against the inside of the container. At least one axially disposed duct is in the container extending from the bottom to the top with a ventilator causing rotation of the evaporated nitrogen from the bottom through the axial duct and to the upper part of the container.

5 Claims, 1 Drawing Sheet

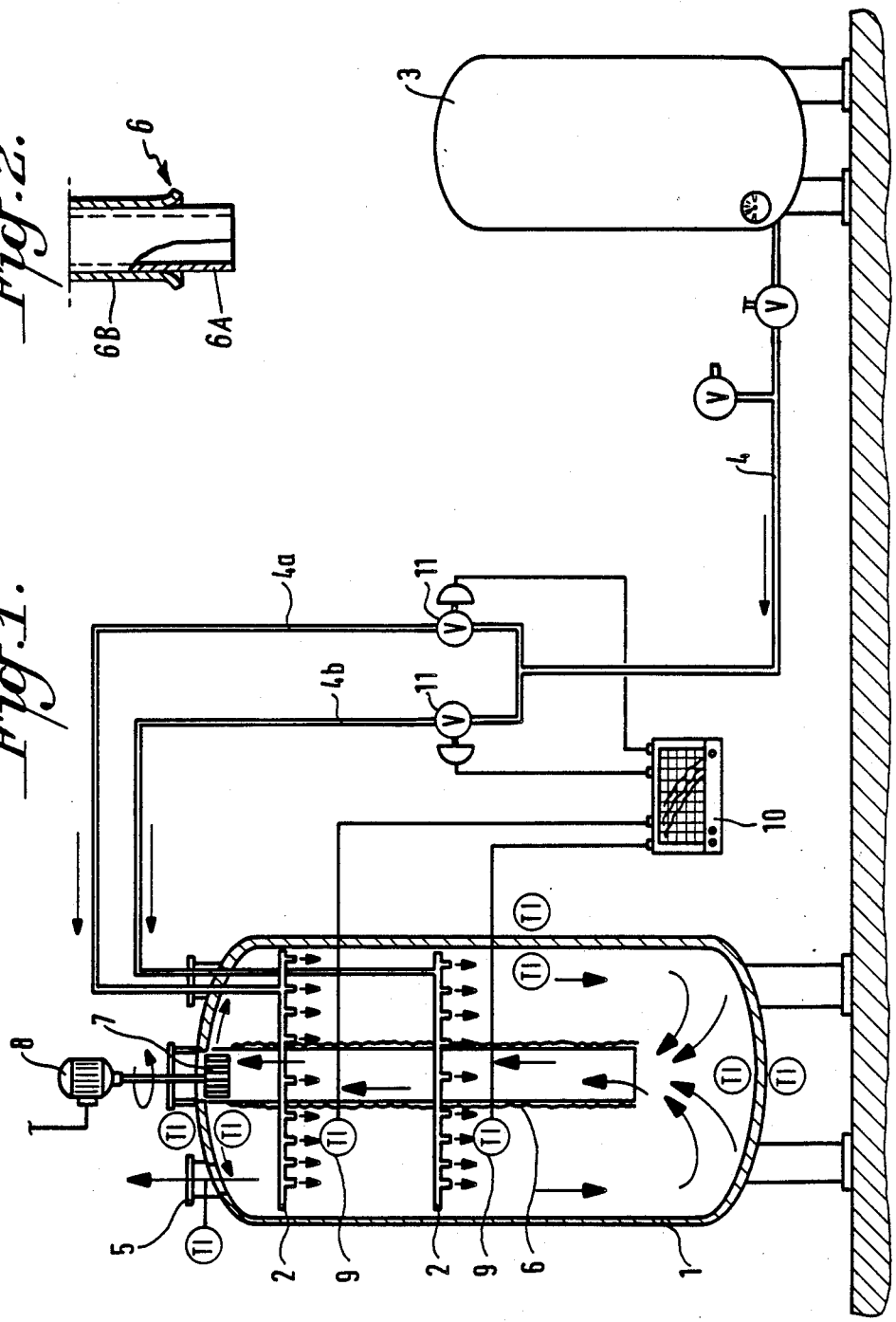

DEVICE FOR THE COOLING OF LARGE, RUBBER-COATED TANKS WITH LIQUID NITROGEN

BACKGROUND OF INVENTION

Many containers in chemical industry are coated with rubber, in order to counteract chemical, thermic or mechanical damage. These rubber coatings deteriorate with time and must be removed and replaced by new rubber coatings. The rubber can be removed with the help of chemical solvents, by burning, or by plain manual removal. These methods are time-consuming, cost intensive, and partially damaging to the environment. When the rubber is burnt off, there may also be changes in the composition of the container's materials. It has therefore been attempted to cause the rubber coating to crack by spraying it with liquid nitrogen. For this purpose, one or several ring-shaped ducts, provided with sprayers, are placed inside the containers, and through these, liquid nitrogen is sprayed onto the inside of the container. Under the influence of the cold from the evaporating nitrogen, the container wall, which is generally made of steel, and the rubber coating will shrink due to the different heat expansion coefficients of rubber. Under continued spraying with liquid nitrogen, low temperatures from $-100°$ C. to $-150°$ C. are finally reached, which cause the rubber to harden completely and to crack. The rubber coating can then no longer compensate for the ever increasing separating forces by altering its shape. The contacat binding is finally broken, without any outside mechanical force having been applied to it. When the container has returned to the surrounding temperature and the oxygen concentration inside the container permits entry, the rubber, which has been cracked from underneath, can then be removed with little effort.

This method for rubber removal works quite well for small containers. In the case of large containers, however, it has already caused material damage. These result from the uneven cooling of the large container. In large containers, cold gas will descend to the lower part of the container, due to its higher specific density. Higher up, the temperature of the evaporating gas in the container increases gradually. This causes an undesirable temperature gradation over the height of the container, which results in tensions in the construction of the container. These additional tensions are slight by themselves and can easily be removed from the container material. In combination with further tensions, however, inadmissible stresses on the container materials may result. These further tensions consist of intrinsic tensions with known intensity and direction and additional tensions from the speed of cooling. To these are now added the additional tensions from a non-uniform temperature field, during cooling and finally also in the cooled stationary condition. Under unfavorable conditions, this may result in stresses that damage or even destroy the container. It should also be considered that many container materials, e.g. ferritic steel, only have a small impact resistance at low temperatures. For these reasons, liquid nitrogen has no longer been used for the removal of rubber on large containers.

SUMMARY OF INVENTION

An object of the invention is to provide a device that makes it possible to remove rubber even from large containers by spraying with liquid nitrogen, without causing additional tensions which could damage the container materials.

With the device according to the invention, liquid nitrogen is brought into the container in the known way, by means of a duct system. Here, the nitrogen draws heat from the container and the rubber coating, evaporates, and flows out into the open through a gas exhaust pipe.

But essential to the device according to the invention is, that the liquid nitrogen is not sprayed arbitrarily through the duct system, but is controlled in such a way that a homogeneous temperature field is produced. This is the purpose of the cold gas rotation produced by the present invention. The coldest nitrogen gas at the bottom of the container is sucked upwards by the ventilator through the duct and propelled into the upper part of the container, where the temperature of the nitrogen itself is higher. When the speed of cooling is also kept slow, preferably between 10 and 20 K/h, an extraordinarily homogeneous temperature field is created over the entire height of the container to be cooled. The thermic tensions, resulting from the temperature changes and superimposed on the intrinsic tensions, then remain negligibly small and occur equally distributed over the container wall. With the device of present invention, it is possible to remove rubber by cooling with liquid nitrogen even from containers made of materials that have but low impact resistance at low temperatures. The controlled cooling made possible by the present device by the formation of a homogeneous temperature field over the height of the container neither causes permanent construction changes in ferritic or austhenitic steel, nor results in changes of the mechanical strength values.

The duct and the accompanying ventilator by themselves can be placed anywhere. The ventilator can also be placed anywhere with respect to the duct. But it is advantageous when the ventilator is built onto the upper part of the duct as a squirrel-cage rotor, which propels the cold gas sucked up from the bottom of the container radially into the upper part of the container. This radial flow direction can be also effected by means of turn-around devices. When the ventilator is placed at the top part of the duct, its drive connection can be kept short. The drive itself is suitably placed outside the container. The duct is functionally built as a tube. In order to facilitate the use of this device in different sizes of container, this tube is adjustable in length. This can be done by using two tubes, one of which slides in the other in telescope fashion.

A hose may also be used for the duct. Using a coiled hose also provides very simple possibilities for length adjustment of the duct.

In very large containers, several ducts with ventilators may also be placed parallel. The cost of mounting the device of present invention can be quite low. It may also be used without further ado in X areas and at very low temperatures, i.e. below $-1801°$ C. With the device of present invention, the environment-friendly cryogenic rubber removal can be performed even on large containers, without danger of damaging the materials.

THE DRAWINGS

FIG. 1 illustrates in schematic form a possible execution of the invention; and

FIG. 2 illustrates a modified form of axial hose.

DETAILED DESCRIPTION

FIG. 1 illustrates a large container 1, whose rubber coating will be cracked and chipped off by spraying with liquid nitrogen. The liquid nitrogen is sprayed into the inside of the container through two ring-shaped ducts 2 provided with sprayers. The liquid nitrogen is taken from a stationary tank 3 and reaches the ring ducts 2 by way of conduits 4, 4a, and 4b. The evaporated nitrogen gas escapes into the open through the gas exhaust 5. According to the invention, a coiled hose 6 is placed axially inside the container, reaching to the bottom area of the large container 1. At the top of the coiled hose 6 is placed the ventilator 7, built as a squirrel-cage rotor, with an electrical driving motor 8 outside the large container 1. The ventilator 7 sucks up the cold nitrogen gas from the bottom of the container through the coiled hose 6 into the upper part of the large container 1. The sucked-up gas here flows out in a radial direction. The directions of flow are represented by unmarked arrows. In this way, the evaporated nitrogen is constantly rotated about the large container 1, so that nitrogen from the coldest part of the container is propelled into the warmest part. Gaseous nitrogen constantly escapes through the gas exhaust pipe 5, in an amount corresponding to the entering amount of liquid nitrogen. The rotation of cold gas by itself already effects the formation of a very homogeneous temperature field over the entire height of the large container 1. In addition, the cooling speed is kept slow. This is controlled by means of numerous temperature measurement sites 9. The temperature measuring and regulating unit 10 controls the doses of liquid nitrogen in the ring ducts 2 by means of the magnetic valves 11 in the conduits 4a and 4b, depending on the requirements. Instead of the coiled hose 6, one may of course also use a straight hose. FIG. 2 illustrates a modified form of axial hose or duct in the form of a tube 6 which is adjustable in length by using a plurality of tube sections with one section 6A sliding in the other section 6B in telescope fashion.

What is claimed is:

1. In a device for cooling rubber-coated large containers with liquid nitrogen in order to crack and remove the rubber coating, with at least one ring-shaped duct provided with sprayers for entering the liquid nitrogen into the inside of the container, the container having a top at its upper part and a bottom at its lower area, the container further having an axial direction extending from its top to its bottom, the liquid nitrogen evaporating after being sprayed into the container to result in evaporated nitrogen in the container, the improvement being in at least one duct placed in the axial direction of the container and reaching from the top of the container to its bottom area, and a ventilator attached to said axial duct so as to cause a rotation of the evaporated nitrogen from the bottom of the container through said axial duct and to the upper part of the container.

2. Device of claim 1, characterized thereby in that said axial duct is built as a tube.

3. Device of claim 2, characterized thereby in that said tube is adjustable in length by using a plurality of tube sections one of which slides in the other in telescope fashion.

4. Device of claim 3, charaacterized thereby in that said axial duct has a top, the ventilator consists of a squirrel-cage rotor placed at the top of said axial duct with a drive mounted exterior of the container.

5. Device of claim 1, characterized thereby in that said axial duct has a top, the ventilator consists of a squirrel-cage rotor placed at the top of said axial duct with a drive mounted exterior of the container.

* * * * *